Oct. 28, 1941.   C. BEESON   2,260,550
HITCH
Filed Feb. 13, 1941   2 Sheets-Sheet 1

Inventor
Clifford Beeson

By Clarence A. O'Brien
Attorney

Oct. 28, 1941.          C. BEESON                2,260,550
                          HITCH
              Filed Feb. 13, 1941        2 Sheets-Sheet 2
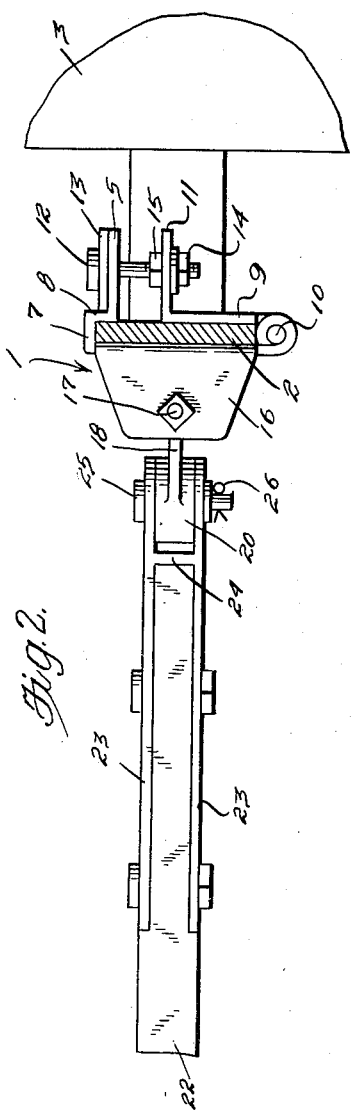
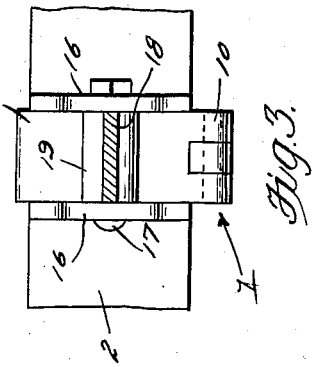
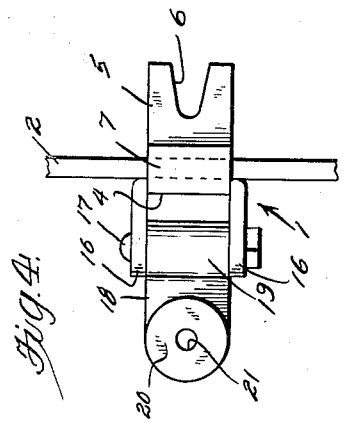
Inventor
Clifford Beeson
By  Clarence A. O'Brien
Attorney Patented Oct. 28, 1941

2,260,550

UNITED STATES PATENT OFFICE 2,260,550

HITCH

Clifford Beeson, Fossil, Oreg., assignor of one-half to Jack F. Combes, Fossil, Oreg.

Application February 13, 1941, Serial No. 378,792

1 Claim. (Cl. 280—33.44)

The present invention relates to new and useful improvements in hitches particularly for connecting trailers to motor vehicles although it will be understood, of course, that the device may be used for any other purpose for which it may be found adapted and desirable.

An important object of the invention is to provide, in a manner as hereinafter set forth, a hitch of the character described embodying a construction which is such as to permit universal swinging movement of the tongue of the trailer, implement or the like.

Another very import object of the invention is to provide a hitch of the character set forth which is adapted to be expeditiously secured to and removed from the rear bumper of a vehicle and which, further, is adapted to be mounted on various types or sizes of bumpers.

Other objects of the invention are to provide a hitch of the aforementioned character which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a cross sectional view taken substantially on the line 2—2 of Figure 1 through the vehicle bumper, showing the hitch in side elevation.

Figure 3 is a cross sectional view through the hitch, taken substantially on the line 3—3 of Figure 1.

Figure 4 is a top plan view with portions of the hitch omitted.

Figure 1:
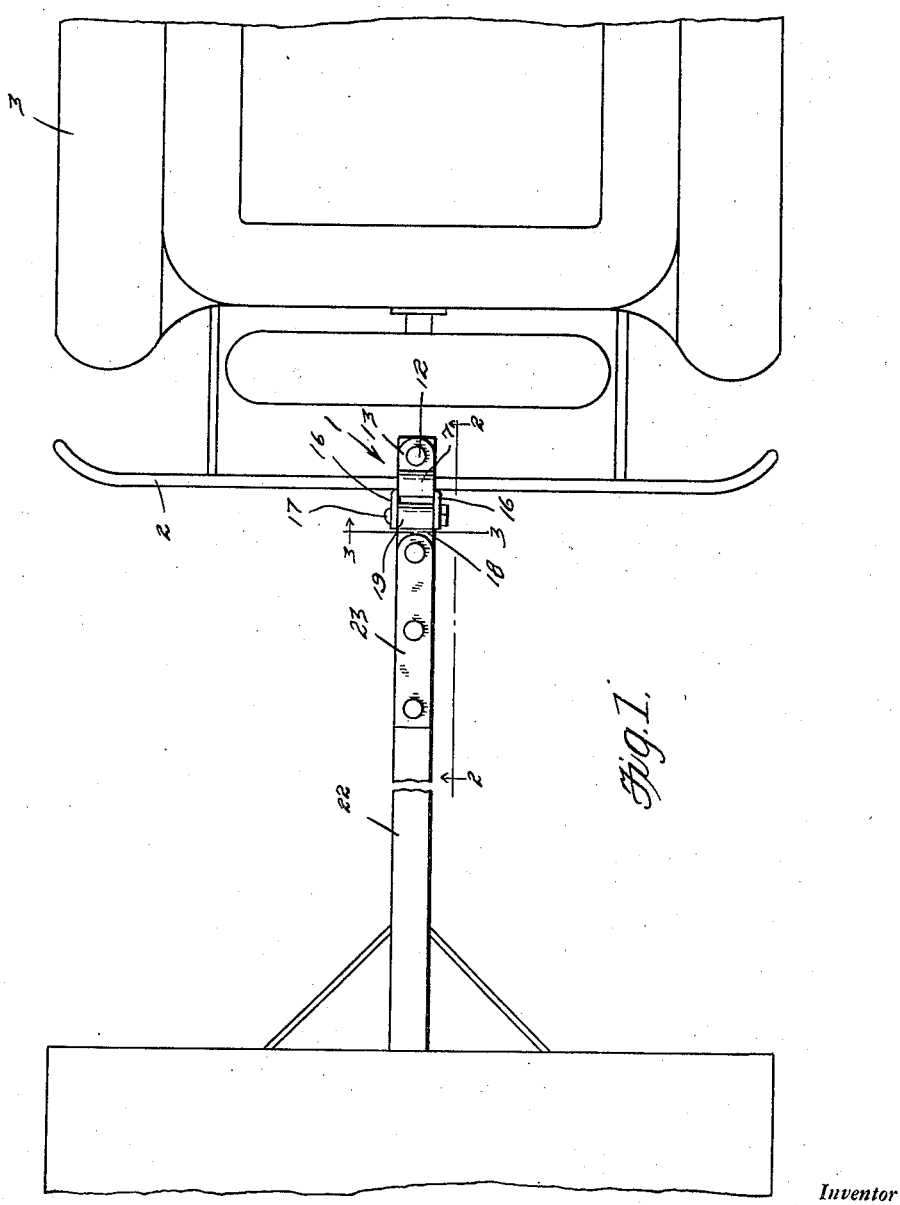
Figure 1 is a top plan view, showing a hitch constructed in accordance with the present invention in use.

Referring now to the drawings in detail, it will be seen that the embodiment of the invention which has been illustrated comprises a clamp of suitable metal which is designated generally by the reference numeral 1. The clamp 1 is adapted to be removably mounted on a rear bumper 2 of a vehicle 3. Toward this end, the clamp 1 includes a vertically elongated plate 4 which is engageable with the rear face of the bumper 2. Projecting forwardly from the upper end of the plate 4 is an integral, stationary jaw 5 having extending thereinto from its forward end a substantially V-shaped slot 6. The jaw 5 further includes a horizontal inner portion 7 which extends over the bumper 2 and a vertical intermediate portion 8 which extends downwardly from said portion 7 in front of said bumper 2. A swinging jaw 9 is connected to the lower end of the plate 4 through the medium of a hinge 10. The hinge 10, it will be noted, is located beneath the bumper 2. The swinging jaw 9 comprises an angularly projecting free end portion 11 which extends in spaced, opposed relation to the stationary jaw 5 in front of the bumper 2. The slot 6 in the jaw 5 is for the reception of a bolt 12 which extends through an opening provided therefor in the portion 11 of the jaw 9. A substantially segmental washer 13 is provided between the jaw 5 and the head of the bolt 12. The portion 11 of the swinging jaw 9 is firmly secured to the bolt 12 through the medium of nuts 14 and 15 which are threaded on said bolt. The portion 11 of the swinging jaw 9 is secured between the nuts 14 and 15.

The clamp 1 further includes opposed ears 16 which extend rearwardly from the vertical edges of the plate 4. Extending between the ears 16 is a bolt 17. Mounted for swinging movement in a vertical plane on the bolt 17 is a link 18. The link 18 includes a horizontally extending eye 19 on its forward end which is journaled on the bolt 17 between the ears 16. The rear end portion of the link 18 is formed to provide a comparatively thick, horizontal disk 20 having formed therein a centrally located, vertical opening 21.

The tongue of the trailer or implement is indicated at 22. Secured above and below the forward end portion of the tongue 22 and projecting forwardly from said tongue is a pair of metallic bars 23. The bars 23 are joined by an integral connection 24 at the forward end of the tongue 22. The bars 23 terminate in rounded forward end portions which receive therebetween the disk 20. A coupling pin 25 connects the bars 23 to the disk 20 for swinging movement, said coupling pin passing through the opening 21 in said disk 20. Of course, the forward end portions of the bars 23 are apertured to receive the coupling pin 25. The coupling pin 25 is secured in position by a cotter pin 26 in the lower end portion of said coupling pin.

It is thought that the operation of the hitch will be readily apparent from a consideration of the foregoing. The link 15 is adapted to swing freely in a vertical plane on the clamp 1 and the bars 23 swing in a horizontal plane on said link. Thus, universal swinging movement of the tongue 22 relative to the bumper 2 is permitted. By removing the single nut 14 the clamp 1 may be expeditiously removed from the bumper 2. Of course, the jaws 5 and 9 secure the clamp 1 in position on the bumper 2. The clamping action of the jaws 5 and 9 may be regulated as desired by adjusting the nut 15 on the bolt 12.

It is believed that the many advantages of a hitch constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A hitch of the class described comprising a clamp adapted to be removably secured on a vehicle bumper, said clamp comprising a vertically elongated plate engageable with the rear face of the bumper, a stationary jaw projecting inwardly and forwardly from the upper end of the plate, said stationary jaw having a horizontal inner portion extending over the bumper, a vertical intermediate portion extending downwardly in front of the bumper, and a free end portion with a substantially V-shaped slot extending horizontally from said vertical intermediate portion, a swinging jaw hingedly connected to the lower end of the plate, said swinging jaw having a vertical portion extending upwardly in front of the bumper and an angularly projecting free end portion extending in spaced opposed relation to the free end portion of the stationary jaw, a bolt extending through an opening in the free end portion of the swinging jaw and received in the V-shaped slot of the free end portion of the stationary jaw for securing together the said jaws, and opposed ears joined by a bolt and extending rearwardly from the vertical edges of the plate; a link having one end thereof mounted on said bolt for swinging movement in a vertical plane and having the other end thereof provided with a horizontal disk and means for connecting said disk with a trailer tongue including portions to embrace the tongue and spaced parallel portions adapted for and pivotally connected with said disk.

CLIFFORD BEESON.